No. 783,783. Patented February 28, 1905.

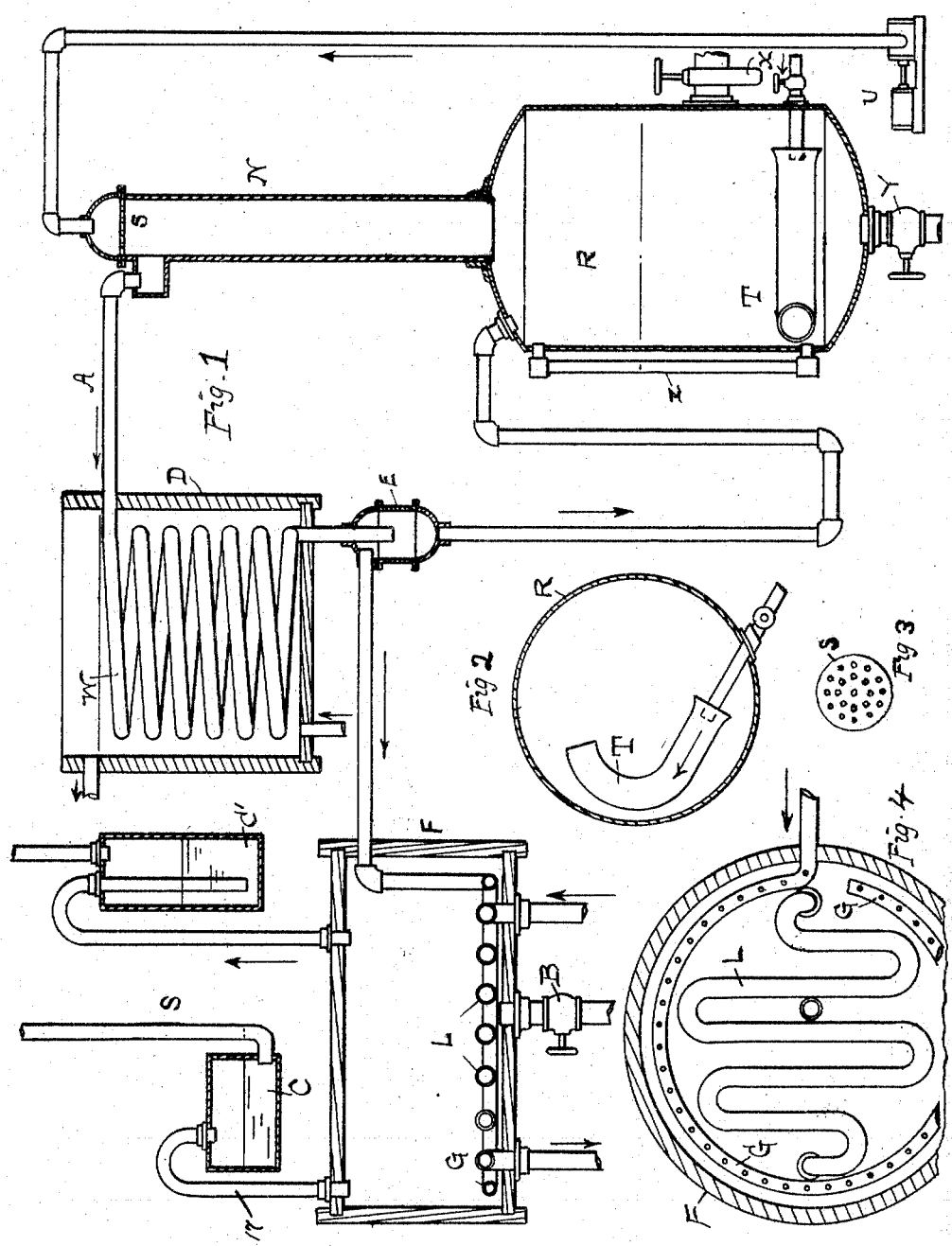

UNITED STATES PATENT OFFICE.

EDWARD R. HEWITT, OF GARDEN CITY, NEW YORK.

APPARATUS FOR THE RECOVERY OF VOLATILE ACIDS FROM SOLUTIONS.

SPECIFICATION forming part of Letters Patent No. 783,783, dated February 28, 1905.

Application filed March 7, 1902. Serial No. 97,137.

*To all whom it may concern:*

Be it known that I, EDWARD R. HEWITT, a resident of Garden City, in the county of Queens, State of New York, have invented certain new and useful Improvements in Apparatus for the Recovery of Volatile Acids from Solutions, of which the following is a specification.

My invention relates to apparatus used for the purpose of recovering volatile acids, and it is particularly designed for the recovery of the sufurous acid from the solution of sulfurous acid in water impregnated with bone salts, which is produced in the treatment of bones for the separation of the bone salts from the gelatinous substances.

In my application Serial No. 97,138, filed of even date herewith, I have described and claimed a process for making glue, and the apparatus described and claimed herein is useful for the recovery of the sulfurous acid used in that process. Its usefulness is, however, by no means confined to such a process; but it is adapted for use wherever it is desired to recover an easily-volatilized acid, such as sulfurous acid, from an acid solution containing soluble salts.

In the leaching of bones for the separation of the bone salts from the gelatinous substances it has heretofore been customary to treat the bones with sulfurous acid and water, the bones being submerged in water and the acid gas passing into contact with or through the water. The bone salts are dissolved by this solution of sulfurous acid and water, and the solution containing the bone salts is drawn off to be treated for the recovery of the sulfurous acid and the bone salts. It is to this recovery treatment that my apparatus is particularly adapted.

I have illustrated in the accompanying drawings and shall now proceed to describe a preferred form of my invention, which I have used in actual practice; but I do not consider that my invention is limited to the specific details shown.

The scope of my invention is pointed out in the appended claims.

Referring to the drawings, Figure 1 is a section of the apparatus in which the acid gas is freed from the acid solution and is again dissolved in water and cooled. Fig. 2 is a plan of the interior of the acid-recovery tank R. Fig. 3 is a plan of the porcelain sprayer S. Fig. 4 is a plan of the interior of the gas absorption and cooling tank.

In the practical use of my invention the acid solution containing the bone salts is drawn from the bones into a storage-tank. (Not shown.) From this tank it is pumped by the pump U into the recovery-chamber R. After the solution has accumulated to a sufficient depth in the tank R steam is admitted through the curved piped T, which is open at its end, as shown. The curved pipe is therefore filled with the solution, and it should be made large enough to hold a sufficient amount of the solution to permit a large proportion of the steam to be condensed before it passes out into the main body of the liquid. This construction serves to transmit most of the heat units in the steam to the liquid. The admission of the steam under a column of liquid of considerable height also contributes to this end, with the result that practically all of the heat in the steam is imparted to the liquid. If these precautions were not adopted and it were attempted to introduce the steam under a thin layer of liquid, a large amount of the steam would pass off from the top of the liquid without having given up its heat, and the cost of the acid-recovery operation would be greatly increased. As soon as the liquid becomes hot enough so that all the steam is not condensed in the body of liquid the sulfurous acid is carried mechanically by the steam up into the condenser N, where the acid separates in the form of gas. Since the apparatus is inclosed, this gas is forced by its own pressure upward through the condenser N and into the pipe A.

In the meantime the liquid from the pump U has been flowing through the porcelain spray-plate S at the top of the jet-condenser N, so that the rising hot acid-gas and water-vapor comes in contact with the spray and gives up considerable of its heat, raising the temperature of the incoming liquid to about 180° Fahrenheit. This operation is doubly advantageous because the heating of the liquid spray before it reaches the main body of the liquid in the tank R reduces the amount of steam which is required and because the cooling of the outgoing water-vapor and gas reduces the expense of the further reduction in temperature of the gas before it is again put in solution and used for treatment on the bones. I have found that if the used acid solution is heated to liberate the gas by bringing it in contact with heated surfaces the phosphate in the solution will precipitate upon and become attached to such heated sufaces, forming a crust of heat insulation, which quickly increases the necessary source of heat to a prohibitive extent. The phosphate will precipitate in any event; but the use of open steam, as described, prevents incrustation or deposition by continually agitating the body of liquid. When the operation is completed, as at the end of a day's work, the liquid may be removed through the large pipe at the bottom of the tank R, controlled by the valve X. This prevents the formation of a cake of phosphate in the bottom and also prevents a collapse of the apparatus, due to the partial vacuum which would otherwise result from the condensation of steam. The curvature of the pipe T serves to increase the agitation of the liquid by causing the incoming steam to set up a whirling motion in the body of the liquid. I have found that if the condenser N be made very small in diameter the phosphate in the liquor carried up by the steam and vapor will sometimes be deposited on the walls of the condenser to clog up the passage. I have found that with the proportions shown the condenser should be about sixeen inches in diameter. I prefer to use a tank R about eight or ten feet high and three feet in diameter and employ a water-gage Z, so that the level of the liquid in the tank R may be determined at a glance. The tank should be made of thick lead of three-eights to one-half an inch, constructed so that any break can be readily seen. In the normal operation of this apparatus the liquor freed from acid is led off from near the top of the column through the valve X. The idea is to carry this liquor off from a point as far removed as possible from the place of condensation of the steam. If desired, the phosphate liquor from the valve X may be conducted around the pipe leading from the pump U to the top of the condenser. This would save some heat, since the cool incoming liquor would be partially heated before entering the condenser; but the apparatus as shown is satisfactory and economical in operation. The phosphate in the liquor thus drawn off may be recovered by sedimentation or by any suitable chemical treatment and may be utilized in the arts, as well known. The heat of this liquor may be used in any desired way, such as heating the building. The gas and water-vapor are forced through the pipe A by the gas-pressure, which is not sufficient, however, to overcome the fluid-pressure maintained by the pump U. If it were not for the preliminary cooling of the jet-condenser, a very much greater expenditure of heat units would be required in subsequently cooling the very hot water-vapor and gas which comes from the solution in the recovery-tank. Through the pipe A the hot gas and water-vapor pass into the coil of pipe or worm W, which is surrounded by cold water in the cooling-tank D. In this worm the water-vapor condenses and the gas is further cooled prior to the preparation of a fresh acid solution. I have found that the water condensed in the worm will not flow back into the recovery-tank through the pipe A, even if this pipe is inclined toward it, for the reason that the flow of the gas in the opposite direction is too great. For this reason a separator E is arranged above the liquid-level in the recovery-tank R and communicating with the lower end of the worm W. In this separator the water descends, while the dry gas flows to the left into the absorption-tank. The water from the separator having acid in solution may be used for treatment on the bones after having been suitably cooled, or it may be led back to the recovery-tank, as shown, for a complete separation of the acid. The dry gas is led to the left into a coil G at the bottom of the absorption-tank F, which may be lined with lead. The pipe G is closed at its end and provided with a number of perforations, as shown, in order to distribute the gas in small quantities throughout the entire body of cold water, which is admitted to the bottom of the tank F through valve B. This valve B must not be at the top, because the tank would collapse, owing to the vacuum caused by the rapid absorption of gas following the introduction of water after the tank had been partially emptied in such way as to expose large surfaces to the gas. The tank F is made tight with the exception of the pressure-regulator C, which consists of a smaller tank containing oil which will neither freeze nor evaporate at ordinary temperatures. A pipe 17 connects the tank F with the open space above the oil in the regulator C and the oil is exposed to the atmosphere through another pipe, 18. When the cold water is introduced into the tank F through the valve B, the oil is forced up in the pipe 18. The gas is continually flowing into the tank F from the coil G, and in case the water is admitted too suddenly through the valve B a vacuum and collapse of the tank would be liable to occur were it not for the regulator C. In such case the oil column descends in the pipe 18, which is also the case when the solution is drawn off through the valve B, this action serving to fill the tank F with air. This absorption operation generates a large amount of heat, and I have invented a process for treating bones in which it is necessary to dissipate this heat before the solution is applied to the bones, as described in my application Serial No. 97,138. I have therefore included as a part of my recovery apparatus means for dissipating this heat, comprising a coil L of considerable length in the tank F, and cold water is passed through this coil to carry off the heat of absorption.

There will usually be a surplus of gas in the tank F, and this may be led through the water in the tank C' to the tower where the gas was originally made, where the carbonic-acid gas which has been carried by the sulfurous-acid gas all the way through the recovery apparatus may escape. If desired, the surplus sulfurous-acid gas from the tank F may be led into a recovery-tank similar to the tank F. The sulfurous-acid gas originally coming from the tower in which it is made may also be put in solution in an apparatus like the absorption-tank F.

What I claim as my invention, and desire to secure by Letters Patent, is—

1. An apparatus for the recovery of volatile acids from solutions containing soluble salts, comprising a receptacle for the solution, an open-ended pipe extending into the receptacle near the bottom thereof, for the admission of live steam, and a curved condensing-chamber surrounding the open end of said pipe, whereby condensation of the steam is induced and the liquid in the receptacle is given a whirling motion.

2. An apparatus for the recovery of volatile acids from solution, comprising a receptacle for the solution, a pipe rising from said receptacle, and an opening for the admission of the solution and an opening for the exit of rising gases, in said pipe.

3. An apparatus for the recovery of volatile acids from solution, comprising a recovery-tank, a stack rising from said tank, an inlet for the solution in said stack, a sprayer-plate below said inlet, and a gas-exit below said sprayer-plate.

In witness whereof I have hereunto signed my name this 21st day of February, 1902.

EDWARD R. HEWITT.

In presence of—
WM. H. BERRIGAN,
JAMES J. COSGROVE.